United States Patent [19]
Haller et al.

[11] Patent Number: 4,704,713
[45] Date of Patent: Nov. 3, 1987

[54] OPTICAL RING NETWORK

[75] Inventors: Neil M. Haller, Mendham; Lanny S. Smoot, Morris Township, Morris County, both of N.J.

[73] Assignee: Bell Communications Research, Inc., Livingston, N.J.

[21] Appl. No.: 813,386

[22] Filed: Dec. 26, 1985

[51] Int. Cl.$^4$ .............................................. H04B 9/00
[52] U.S. Cl. .......................................... 370/3; 370/16; 455/601; 455/607; 455/612
[58] Field of Search ................ 455/601, 606, 607, 612; 370/3, 15, 16, 88; 455/8

[56] References Cited

U.S. PATENT DOCUMENTS
4,048,446  9/1977  Hafner et al. ........................ 370/16

FOREIGN PATENT DOCUMENTS
0107017     5/1984   European Pat. Off.
58-44832    3/1983   Japan.
60194631A  10/1985   Japan ........................................ 370/3
2121637A   12/1983   United Kingdom ................. 455/612

OTHER PUBLICATIONS
"Fail Safe Nodes for Lightguide Digital Networks", The Bell System Technical Journal, vol. 61, No. 2, Feb. 1982, pp. 247-256.

Primary Examiner—Robert L. Griffin
Assistant Examiner—Leslie Van Beek
Attorney, Agent, or Firm—James W. Falk

[57] ABSTRACT

An optical fiber-ring network is disclosed. The network is capable of operating in the face of the failure of any single node regardless of the particular node failure mechanism, including stuck "on" and stuck "off" transmitters.

Each node in the network comprises a main receiver, an alternate receiver, and a transmitter. The main receiver receives data from the immediately adjacent upstream node, while the alternate receiver monitors transmissions from the next preceding upstream node. Each node diagnoses the transmitter in its immediately adjacent upstream neighbor and its own main receiver. If either fails, the node switches from its main receiver to its alternate receiver to bypass the immediately adjacent upstream node, while the rest of the ring remains functional.

7 Claims, 4 Drawing Figures

OPTICAL RING NETWORK

TECHNICAL FIELD

This invention relates to a fiber-optic ring network, and more particularly to a fiber-optic ring network that is capable of operating in the face of the failure of any single node regardless of the particular node failure mechanism.

BACKGROUND OF THE INVENTION

A conventional fiber-optic ring network comprises a plurality of nodes which are linked by optical fibers in a ring-like configuration. The ring may be designed so that data can be transmitted either clockwise or counter clockwise around the ring but not both.

Each node comprises a receiver and a transmitter. The transmitter in each node produces a modulated optical signal at a wavelength which can be detected by the receiver at the adjacent downstream node, where downstream is defined as the next node in the direction of data propagation around the ring. Data is transmitted from an originating node to a destination node by passing through each intermediate node on the ring between the originating node and the destination node. At each intermediate node, the data is detected by the receiver and regenerated in optical form by the transmitter.

In order for the entire ring to operate properly, the transmitter and receiver at each node must operate properly. Since there is only a single communications path around the ring, if any transmitter or receiver should malfunction, communication in the ring network would be severed.

One way in which a node can fail is for its transmitter to be stuck in the "off" mode. A fiber-optic ring network which overcomes this particular type of node failure is disclosed in A. Albanese "Fail Safe Nodes for Lightguide Digital Networks", The Bell System Technical Journal, Vol. 61, No. 2, February 1982, pp. 247-256. The fiber-optic ring of the aforementioned article is designed so that a small amount of light emitted by each node transmitter bypasses the immediately adjacent downstream node. Under normal circumstances, this "leakage light" is overwritten by the stronger light signal leaving the downstream node transmitter. However, if a node fails because its transmitter is stuck in the "off" mode, the light from the preceding node which bypasses the failed node can be properly detected by the receiver in the next succeeding node.

Thus, while the ring-architecture of the Albanese reference is useful for solving the problem of the stuck "off" transmitter, it is not capable of keeping a fiber-optic ring operating in the face of other types of node failures such as a transmitter which is stuck in the "on" mode. The stuck "on" mode of operation for a transmitter can take several forms including an output which comprises only digital "ones", or a valid looking output signal, which in reality contains garbage. Whatever its form, a stuck "on" transmitter is disastrous to the ring operation as a whole, since the communications path around the ring has been broken. The ring disclosed in the Albanese reference cannot solve this problem because the small amount of bypass light will always be written over by the stuck "on" transmitter.

Accordingly, an object of the present invention is to provide a fiber-optic ring network which is able to operate in the face of the failure of any one node, regardless of the particular cause of the node failure. More particularly, it is an object of the present invention to provide a fiber-optic ring network which is able to operate in the face of a stuck "on" transmitter failure as well as a stuck "off" transmitter failure.

SUMMARY OF THE INVENTION

The present invention is an optical fiber-ring network which is capable of operating if one of the nodes in the ring fails. The ring of the present invention is capable of operating in the face of virtually any type of node failure including a stuck "on" transmitter and a stuck "off" transmitter.

Each node in the fiber-optic ring of the present invention comprises a main receiver, an alternate receiver and a transmitter. The main receiver is used in the same fashion as it would be in a conventional ring; it receives optical transmissions from the transmitter of the adjacent upstream node. The alternate receiver receives the output of the next preceding upstream node. The transmitter in each node optically transmits information to the main receiver of the immediately adjacent downstream node and the alternate receiver of the next succeeding downstream node.

To understand how the ring of the present invention operates in the face of node failure, consider three sequential nodes, an upstream node, a failed node, and a downstream node. If the main receiver fails in the failed node, the failed node switches from its main receiver to its alternate receiver. The effect of this is that the ring is functional but the upstream node is bypassed. If the alternate receiver fails, no action is taken other than to diagnose the failure. If the transmitter fails in the failed node, the downstream node switches from its main receiver to its alternate receiver, and the failed node is bypassed. This happens regardless of the particular failure mechanism of the transmitter.

In other words, each node is able to diagnose a failure of its own main receiver or the functionally equivalent failure of the transmitter in the immediately adjacent upstream node. There is no way to distinguish between these two types of failures. In either case, the node switches from its main receiver to its alternate receiver, to bypass the immediately adjacent upstream node, while enabling the remainder of the ring to continue functioning. Thus, no matter how the failed node fails, the ring remains operational.

In a preferred embodiment of the invention, the optical ring uses two wavelengths. The wavelength used for transmission alternates between wavelength $\lambda_1$ and wavelength $\lambda_2$ at each successive node. Thus, for example, a first node in the ring may transmit wavelength $\lambda_1$ radiation to the main receiver of the immediately adjacent downstream node and to the alternate receiver of the next succeeding downstream node. The immediately adjacent downstream node transmits wavelength $\lambda_2$ radiation to the main receiver of the next succeeding downstream node and to the alternate receiver of the following node. Through the use of wavelength multiplexing techniques only a single ring of optical fiber is required to implement the network. In another embodiment of the invention, a single wavelength of radiation may be used. However, in this case, two optical-fiber rings are necessary to implement the network.

BRIEF DESCRIPTION OF THE DRAWING

FIG. 2b is an enlarged view of one of the nodes in the network of FIG. 2a.

DETAILED DESCRIPTION

Figure 1:
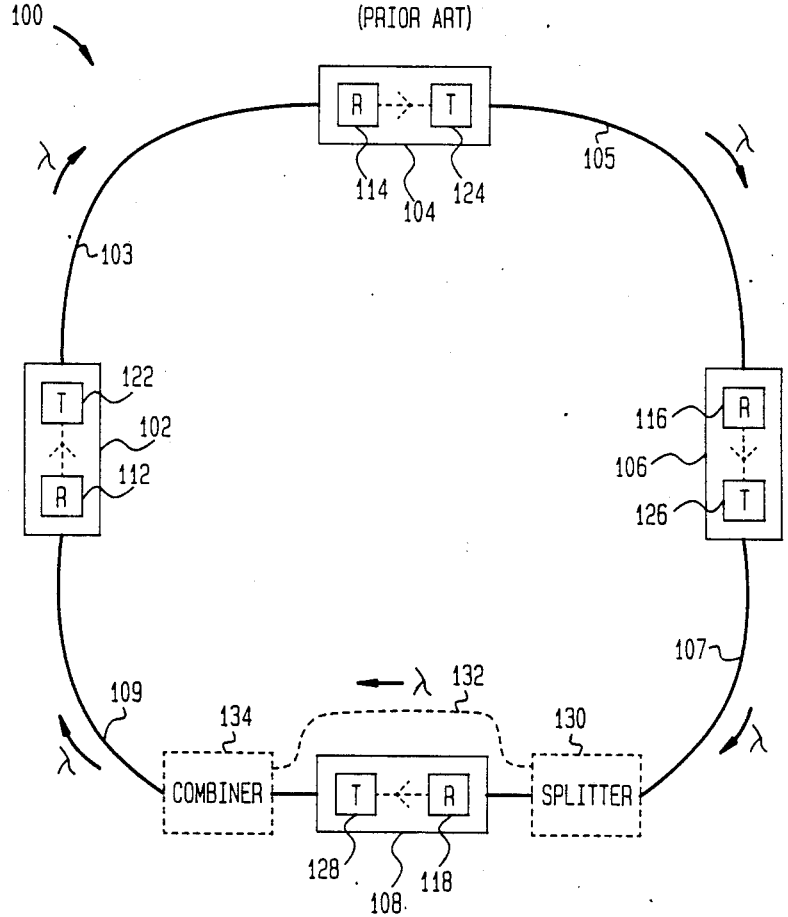
FIG. 1 shows a prior art optical-fiber ring network.

Before describing in detail the optical-fiber ring network of the present invention, it may be helpful to briefly describe a conventional optical-fiber ring network. Turning to FIG. 1, a conventional optical-fiber ring network 100 is illustrated. The ring network 100 includes four nodes 102,104,106,108, although any number of nodes may be included in such an optical-fiber ring network. The nodes 102,104,106,108 are connected in a ringlike architecture by optical fibers 103,105,107,109.

Each of the nodes 102,104,106,108 includes a receiver 112,114,116,118 and a transmitter 122,124,126,128, respectively. Data is transmitted in a clockwise direction around the ring 100. The transmitter in each node produces an optical signal which is detected by the receiver in the immediately adjacent downstream node. Data is transmitted from an originating node to a destination node by passing through each intermediate node on the ring between the originating node and the destination node. For example, data originating at node 108 and having node 106 as its destination, passes through nodes 102 and 104. At nodes 102 and 104, the data is detected by the receiver and optically regenerated by the transmitter for transmission to the next adjacent downstream node.

Thus, in order for the ring to operate properly, the receiver and the transmitter at each node must be operating. Since there is only a single communications path around the ring, if the receiver or transmitter at any node fails to operate, communications in the network would be severed. As indicated above, one particular node failure mechanism is the stuck "off" transmitter. A prior art structure for solving the problem of the stuck "off" transmitter is incorporated into FIG. 1.

In FIG. 1, the splitter 130, the optical fiber bypass path 132, and the combiner 134 (all shown in phantom) define a structure which enables the ring 100 to continue operating if the transmitter 128 of node 108 is stuck in the "off" mode. The splitter 130 diverts a small amount of radiation traveling in the fiber 107 into the bypass fiber 132. The radiation propagating in the bypass fiber 132 is combined with radiation leaving the transmitter 128 on fiber 109 by means of the combiner 134. If the transmitter 128 functions properly then the bypass radiation is written over by the stronger optical signal from the transmitter 128. If the transmitter 128 is stuck in the "off" mode, the bypass radiation is detected by receiver 112 of node 102. Thus, even though node 108 is lost, the ring 100 is still functional and other nodes on the ring may communicate with one another. However, while the bypass structure defined by splitter 130, fiber 132, and combiner 134 is useful for solving the stuck "off" transmitter, this structure cannot solve the stuck "on" transmitter problem, as a stuck "on" transmitter would continuously write over the bypass radiation.

Figure 2A:
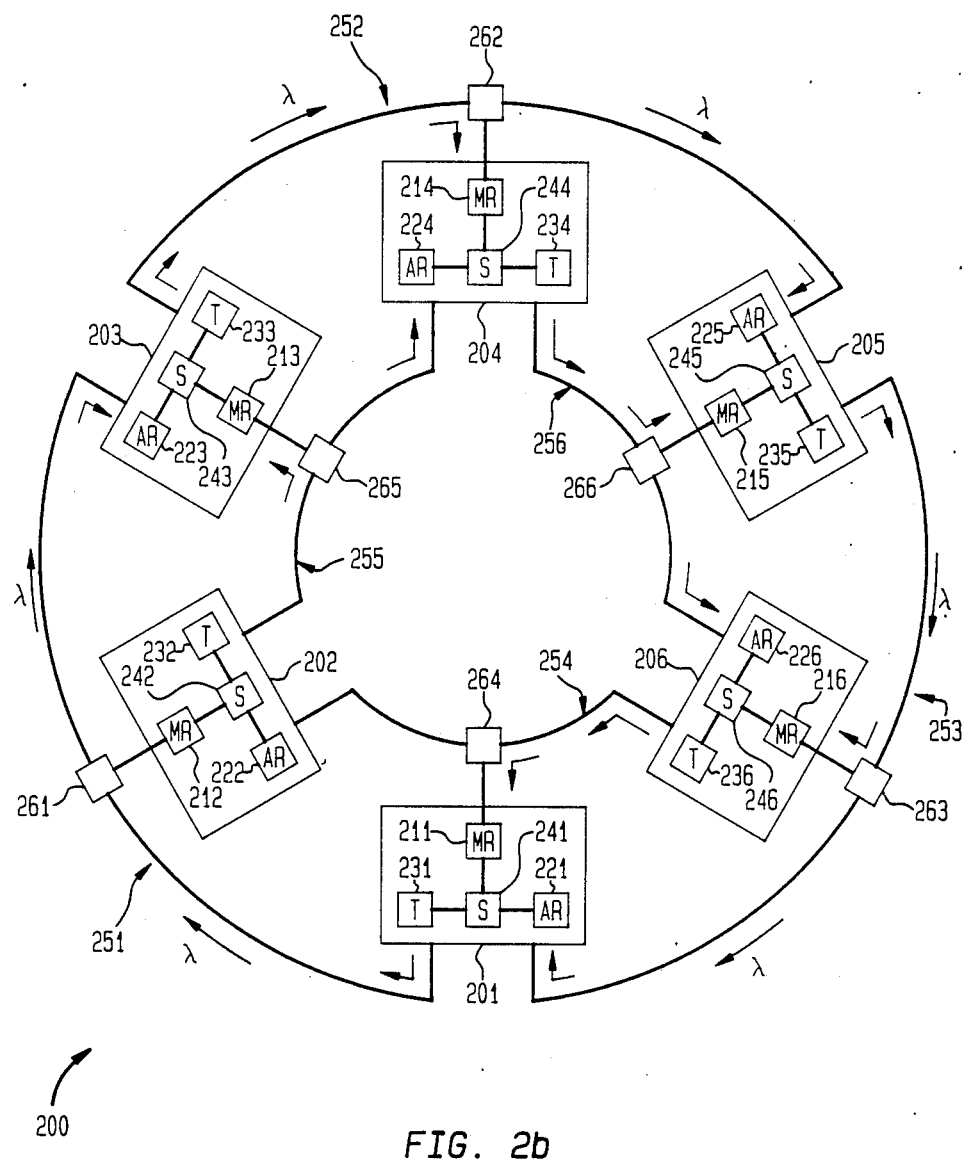
FIG. 2a shows an optical-fiber ring network in accordance with a first illustrative embodiment of the invention.

A fiber-optic ring network which is operative when a node fails, regardless of the node failure mechanism, is schematically illustrated in FIG. 2a. The ring 200 of FIG. 2a comprises a plurality user nodes 201,202,203,204,205,206. Data is transmitted around the ring 200 in the clockwise direction from one node to the next.

Each of the nodes 201,202,203,204,205,206 includes a main receiver 211,212,213,214,215,216 and an alternate receiver 221,222,223,224,225,226. Each of the nodes also includes a transmitter 231,232,233,234,235,236 and a switch 241,242,243,244,245,246 for switching between the main receiver and alternate receiver in a manner to be discussed below. Each of the switches 241,242,243,244,245,246 is operated under the control of a control element such as the control element 290 of FIG. 2b.

Each of the main receivers is adapted to receive a digitally encoded optical signal from the transmitter of the immediately adjacent upstream node. Each of the alternate receivers is adapted to detect the optical signal produced by the transmitter in the next preceding upstream node. These connections are achieved by means of the optical-fiber links 251,252,253,254,255,256. Illustratively each of these links is used to optically connect the transmitter in one of the nodes to the main receiver of the immediately adjacent downstream node and the alternate receiver of the next subsequent downstream node. Splitters 261,262,263,264,265,266 are used to divide the radiation of each transmitter between the main receiver of the immediately adjacent downstream node and the alternate receiver of the next subsequent downstream node. For example, the fiber-optic link 251 serves to transmit an optical signal from the transmitter 231 of node 201 by way of the splitter 261 to the main receiver 212 of the immediately adjacent downstream node 202 and to the alternate receiver 223 of the next subsequent downstream node 203. Similarly, the fiber-optic link 256 serves to transmit the optical signal from the transmitter 234 of node 204 by way of the splitter 266 to the main receiver 215 of the immediately adjacent downstream node 205 and to the alternate receiver 226 of next subsequent downstream node 206.

Within each node, the switch serves to electrically connect either the main receiver or the alternate receiver to the transmitter. When operating normally, the switch serves to connect the main receiver to the transmitter so that the transmitter can optically regenerate the signal detected by the main receiver. However, in the presence of certain types of node failures, the switch switches off the main receiver and connects the alternate receiver to the transmitter in which case the transmitter regenerates the optical signal detected by the alternate receiver.

There are three possible types of node malfunctions, i.e., the transmitter may fail, the main receiver may fail or the alternate receiver may fail. The transmitter may fail by being stuck "on" or stuck "off".

To understand how the ring 200 of FIG. 2 is able to operate in the face of any type of failure mechanism, consider three sequential nodes 203,204,205 wherein node 204 is the failed node and nodes 203 and 205 are its upstream and downstream neighbors, respectively.

If the transmitter 234 in node 204 fails, either because of a stuck "off" or stuck "on" failure, the downstream node 205 switches from the main receiver 215 to the alternate receiver 225. In this case, the ring is functional as node 204 is bypassed and data is transmitted directly from node 203 to node 205. However, no data can pass through or be originated at node 204.

If the main receiver 214 fails in node 204, the switch 244 switches to the alternate receiver 224. The ring is functional, but the upstream neighboring node 203 has been lost. In other words, failure of the main receiver 214 in node 204 is functionally equivalent to the failure of the transmitter 233 in node 203. Thus, data passes around node 203 but no data can pass through or originate at node 203. If the alternate receiver 224 in node 204 fails, the failure is diagnosed but no action is taken.

In short, each node is able to diagnose the failure of its own main receiver and the functionally equivalent failure of the transmitter in the immediately adjacent upstream node. These two types of failures are indistinguishable in the network 200 of FIG. 2a. In either case, the node switches from the main receiver to the alternate receiver to bypass the upstream node.

Thus, the ring 200 is functional in face of any type of node failure including the stuck "on" transmitter type failure.

In a typical mode of operation of the ring 200, a node wishing to transmit waits for a special signal called the token which is passed from node to node around the ring. A node wishing to transmit a message seizes the token and sends its message. When the message returns around the ring the sending node removes the message from the ring and transmits the token over the ring, thus making the ring available for another node.

Fault diagnosis in each node in the ring 200 utilizes the token discussed above. Consider a diagnosing node and its immediately adjacent upstream neighbor. The alternate receiver in the diagnosing node monitors the input to the main receiver in the immediately adjacent upstream node. The main receiver in the diagnosing node monitors the output of the transmitter in the immediately adjacent upstream node.

If the token is seen entering the immediately adjacent upstream node by the alternate receiver in the diagnosing node, then within a predetermined time period, the main receiver in the diagnosing node must detect either the token or a message originating at the upstream node. If neither is detected by the main receiver in the diagnosing node (either because of a failure of the upstream node transmitter or a failure of the main receiver in the diagnosing node itself) the switch in the diagnosing node causes the diagnosing node to switch from its main receiver to its alternate receiver, thus bypassing the upstream node. Of course, a node could become insane and bypass a perfectly healthy upstream node. However, even in this case, the ring is still functional.

Figure 2B:
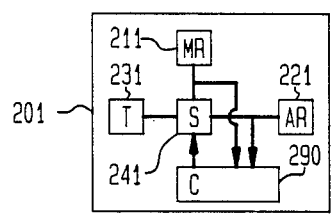

The switch in the diagnosing node is operated under the control of a control element such as the control element 290 of node 201 as shown in FIG. 2b. More particularly, the control element monitors the outputs of the main and alternate receivers and enables the switch to connect one of the receivers to the transmitter in response to these outputs. Thus, the switch may include appropriate delay elements which enable the control element to make its decision before the output from either receiver is passed through to the transmitter.

Figure 3:
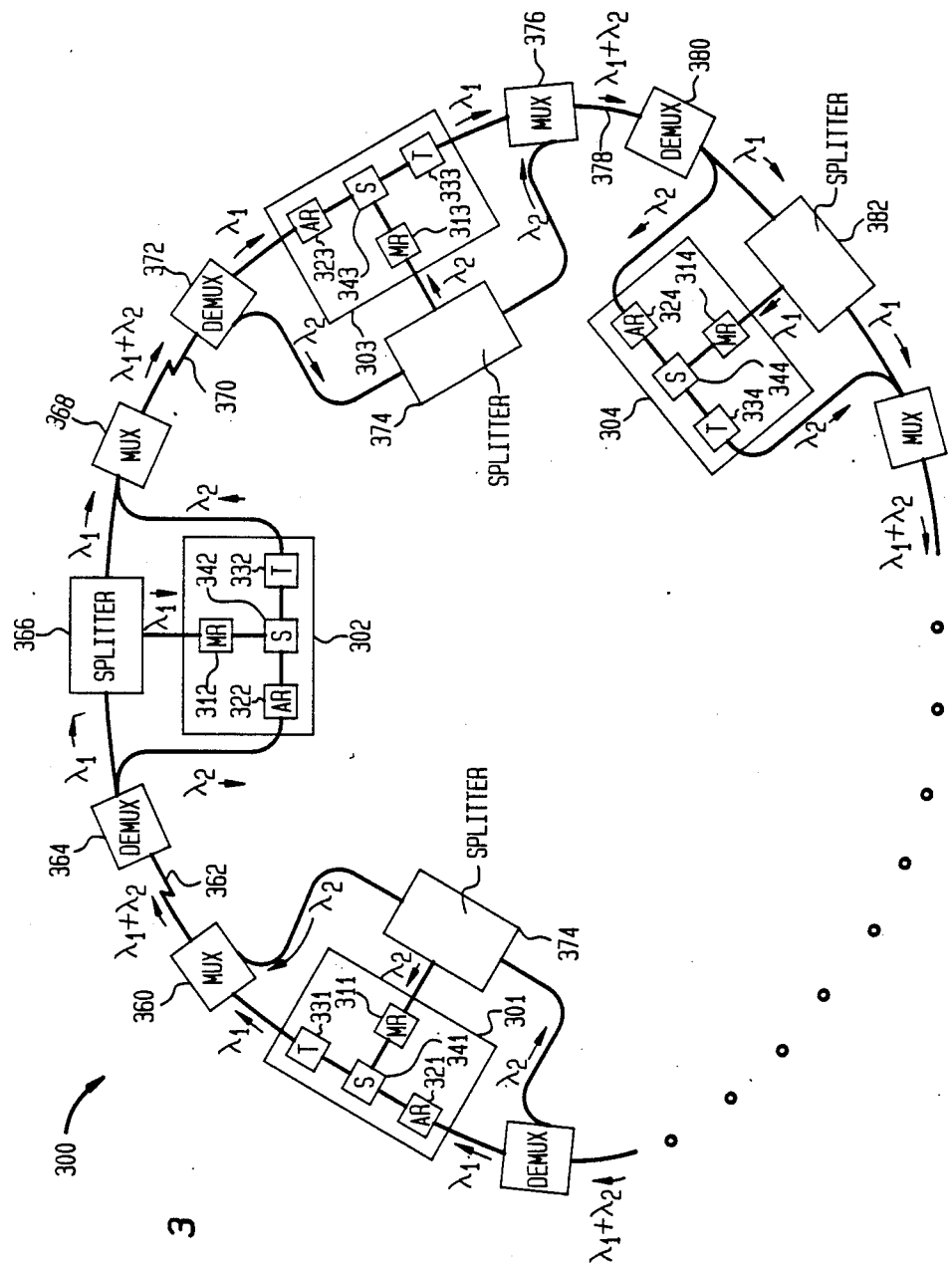
FIG. 3 shows an optical-fiber ring network in accordance with a second illustrative embodiment of the invention.

In the ring network 200 of FIG. 2 there are essentially two optical-fiber paths connecting each of the nodes 201,202,203,204,205,206 to its upstream and downstream neighbors. FIG. 3 schematically illustrates a portion of an optical-fiber ring network 300 in which there is only one optical-fiber path connecting each node to its upstream and downstream neighbor. This is accomplished through the use of wavelength division multiplexing and demultiplexing techniques. Fault diagnosis in the ring 300 and reconfiguration of the ring 300 in response to failed nodes is substantially identical to that of ring 200.

The ring 300 comprises nodes 301,302,303,304, . . . Each of the nodes 301,302,303,304 comprises a main receiver 311,312,313,314, an alternate receiver 321,322,323,324, and a transmitter 331,332,333,334. A switch 341,342,343,344 enables each node to switch from its main receiver to its alternate receiver to bypass an upstream node in the manner discussed above.

In the ring 300, the wavelength used for transmission alternates between wavelength $\lambda_1$ and wavelength $\lambda_2$ at each successive node. Thus, transmitters 331 and 333 in nodes 301 and 303, respectively, transmit at wavelength $\lambda_1$ and transmitters 332 and 334 in nodes 302 and 304, respectively, transmit at wavelength $\lambda_2$. As is the case in the ring 200 of FIG. 2, each of the transmitters transmits radiation to the main receiver of the immediately adjacent downstream node and to the alternate receiver of the next subsequent downstream node.

Thus, transmitter 331 of node 301 produces wavelength $\lambda_1$ radiation. The wavelength $\lambda_1$ radiation is multiplexed with wavelength $\lambda_2$ radiation in wavelength division multiplexer 360. The wavelength $\lambda_2$ radiation originates at an upstream node not shown in FIG. 3. The multiplexed wavelength $\lambda_1$ and wavelength $\lambda_2$ radiation is transmitted by way of fiber 362 to the node 302. At the node 302, the wavelength division demultiplexer 364 separates the wavelength $\lambda_1$ and wavelength $\lambda_2$ radiation. The wavelength $\lambda_2$ radiation goes to the alternate receiver 322 while the wavelength $\lambda_1$ radiation is divided by the splitter 366 so that part of it goes to the main receiver 312 of the node 302. The remainder of the wavelength $\lambda_1$ radiation coming out of the splitter 366 is multiplexed by wavelength division multiplexer 368 with the wavelength $\lambda_2$ radiation produced by the transmitter 332 for transmission to node 303 via optical-fiber 370.

At node 303, the wavelength division demultiplexer 372 separates the wavelength $\lambda_1$ and wavelength $\lambda_2$ radiation. The wavelength $\lambda_1$ radiation (which originated at node 301) goes to the alternate receiver 323. Thus, the wavelength $\lambda_1$ radiation produced by transmitter 331 in node 301 has been divided between the main receiver 312 in the adjacent downstream node 302 and the alternate receiver 323 of the next subsequent downstream node 303. The wavelength $\lambda_2$ radiation is divided by the splitter 374. Part of the wavelength $\lambda_2$ radiation (which originated at transmitter 332 of node 302) goes to the main receiver 313 of node 303. The remainder of the wavelength $\lambda_2$ radiation is multiplexed with wavelength $\lambda_1$ radiation from the transmitter 333 by the wavelength division multiplexer 376 for transmission via optical fiber 378 to node 304.

At node 304 the wavelength division demultiplexer 380 separates the wavelength $\lambda_1$ and wavelength $\lambda_2$ radiation. The wavelength $\lambda_2$ radiation (which originated at node 302) goes to the alternate receiver 324, while the wavelength $\lambda_1$ radiation (which originated at node 303) goes by way of splitter 382 to the main receiver 314. Thus, adjacent nodes in the ring 300 are connected by only one optical-fiber path.

The internal construction of the nodes in ring 300 of FIG. 3 is substantially identical to the internal construction of the nodes in ring 200 of FIG. 2a. In other words, a node does not "know" whether it is connected to adjacent nodes by one optical fiber path with wavelength multiplexing and demultiplexing devices or two optical fiber paths. Thus, fault detection and reconfiguration in response to node failures is the same in ring 300 of FIG. 3 as in the ring 200 of FIG. 2a. Each node can detect a failure in the upstream node transmitter or its own main receiver and bypass the upstream node in response thereto by switching from its main receiver to its alternate receiver. The upstream node will be lost but the ring remains functional. Such switching takes place under the control of a control device such as that shown in FIG. 2b and discussed above.

One restriction on the particular embodiment of the invention shown in FIG. 3 is that the number of nodes should be even. If the number of nodes were odd, two adjacent nodes would have to transmit at the same wavelength, e.g., wavelength λ₁ and wavelength division multiplexing techniques would not be useful.

The above described embodiments of the invention are intended to be illustrative only. Numerous alternative embodiments may be devised by those skilled in the art without departing from the spirit or scope of the following claims.

What is claimed is:

1. A communications network comprising:
   a plurality of nodes arranged in a ring configuration, each of said nodes including a main receiver, an alternate receiver, and a transmitter,
   said nodes interconnected so that each of said transmitters is adapted to transmit data to the main receiver of the immediately adjacent downstream node and to the alternate receiver of the next subsequent downstream node, and
   said nodes further including means for comparing data received by said main receiver with data received by said alternate receiver in order to determine whether to bypass the immediately adjacent upstream node.

2. The network of claim 1 wherein each of said nodes includes a switch means for switching from its main receiver to its alternate receiver when said means for comparing indicate that a failure has occured in said immediately adjacent upstream node, or when its main receiver fails, to bypass said immediately adjacent upstream node while enabling the remainder of the ring network to continue functioning.

3. The communications network of claim 1, wherein each of said transmitters is connected to main receiver of the immediately adjacent downstream node and the alternate receiver of the next subsequent downstream node by means of an optical fiber-link including an optical beam splitter for dividing the radiation emitted by each transmitter between the main receiver of the immediately adjacent downstream node and the alternate receiver in the next subsequent downstream node.

4. The communications network of claim 1 wherein in each of said nodes the main receiver receives radiation at a first wavelength from the transmitter of the immediately adjacent upstream node and the alternate receiver receives radiation at a second wavelength from the transmitter of the next preceding upstream node.

5. A node for use in an optical communications network including a plurality of nodes arranged in a ring configuration, said node comprising:
   a main receiver for receiving optically transmitted data from a transmitter in an immediately adjacent upstream node,
   an alternate receiver for receiving optically transmitted data from a transmitter in the node preceding said immediately adjacent upstream node,
   a transmitter for optically transmitting data to a main receiver in the immediately adjacent downstream node and to an alternate receiver in the next succeeding downstream node, and
   a switch device for switching from said main receiver to said alternate receiver when said main receiver fails or when the transmitter in said immediately adjacent upstream node fails, or when a comparison of the data received by said main receiver with the data received by said alternate receiver indicates that a failure has occurred in said immediately adjacent upstream node, to bypass said immediately adjacent upstream node, while enabling the remainder of the network to function.

6. The node of claim 5 wherein:
   said main receiver receives transmissions from said transmitter in said immediately adjacent upstream node at a first wavelength
   said alternate receiver receives transmissions from said transmitter in said node preceding said immediately adjacent upstream node at a second wavelength, and
   said transmitter transmits at said second wavelength to the main receiver in the immediately adjacent downstream node and to the alternate receiver in the next succeeding downstream node.

7. A communications network comprising:
   a plurality of nodes arranged in a ring configuration, each of said nodes including a main receiver, an alternate receiver, and a transmitter,
   said nodes being interconnected so that each of said transmitters is adapted to transmit data to the main receiver of the immediately adjacent downstream node and to the alternate receiver of the next subsequent downstream node,
   wherein in each of said nodes the main receiver receives radiation at a first wavelength from the trasmitter of the immediately adjacent upstream node and the alternate receiver receives radiation at a second wavelength from the transmitter of the next preceding upstream node, and
   wherein said radiation at said first wavelength and said radiation at said second wavelength are transmitted to each of said nodes by a single optical fiber, each of said nodes having a wavelength division demultiplexor associated therewith for separating said first and second wavelengths.

* * * * *